(No Model.)
C. F., A. L. & A. W. LAWTON.
APPARATUS FOR THE MANUFACTURE OF SALT.
No. 475,575. Patented May 24, 1892.
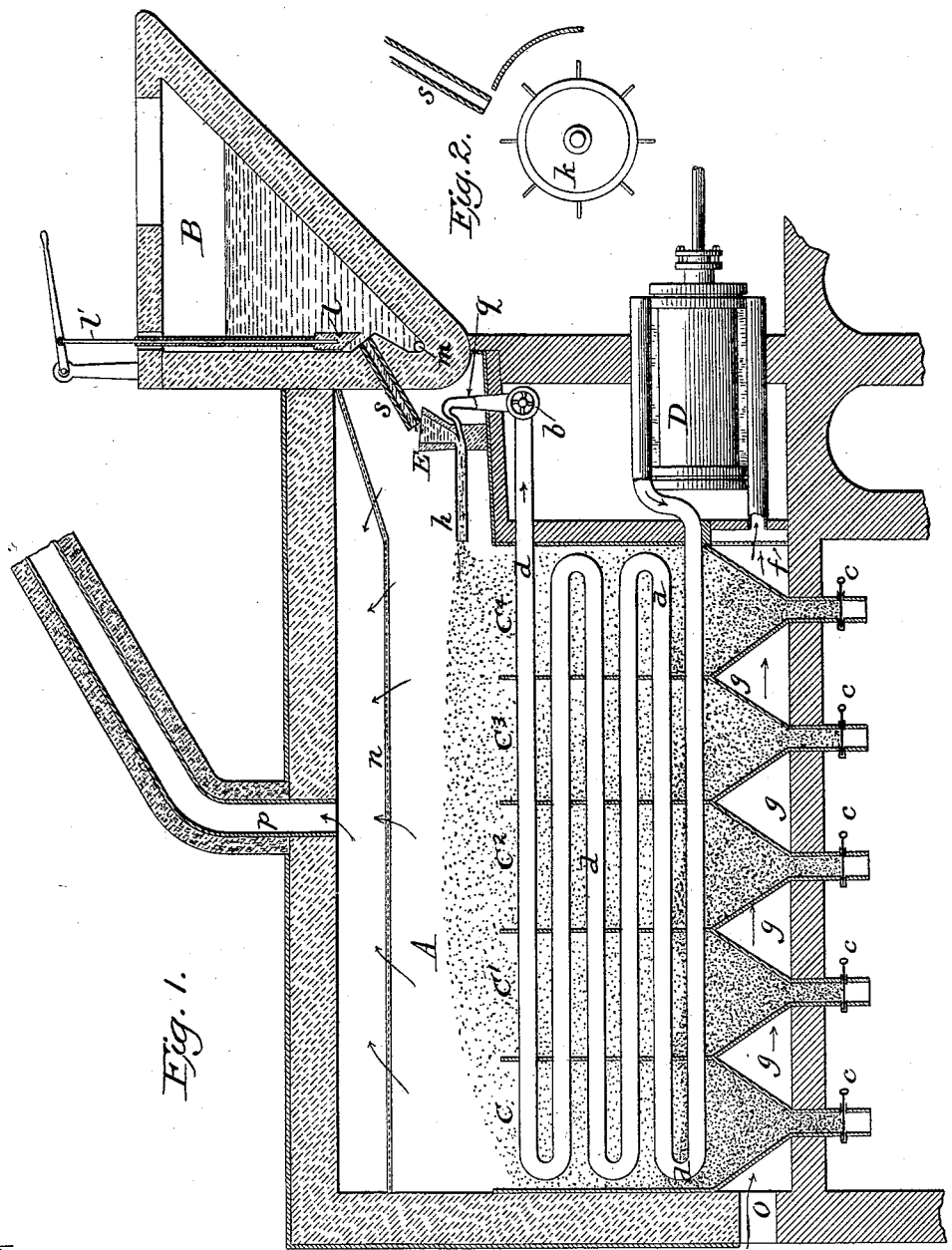
Witnesses:
James F. Duhamel
Horace A. Dodge
Inventors:
CHARLES F. LAWTON,
ALBERT L. LAWTON,
ARTHUR W. LAWTON,
BY Dodge Sons,
THEIR ATTORNEYS

UNITED STATES PATENT OFFICE.

CHARLES F. LAWTON, ALBERT L. LAWTON, AND ARTHUR W. LAWTON, OF ROCHESTER, NEW YORK.

APPARATUS FOR THE MANUFACTURE OF SALT.

SPECIFICATION forming part of Letters Patent No. 475,575, dated May 24, 1892.

Application filed April 1, 1891. Serial No. 387,259. (No model.)

*To all whom it may concern:*

Be it known that we, CHARLES F. LAWTON, ALBERT L. LAWTON, and ARTHUR W. LAWTON, citizens of the United States, residing at Rochester, in the county of Monroe and State of New York, have invented certain new and useful Improvements in Apparatus for the Manufacture of Salt, of which the following is a specification.

Our invention relates to the manufacture of salt, and has for its object the cooling and shaping of common salt from a hot fused state into hollow spherical drops of globules more or less fine. This is carried out in a confined space in the presence of common air or in the presence of any special gas or gases without wasting the gas, the saving of the heat given off from the cooling salt enabling the heat to be used either for the preliminary heating of the salt which is to be fused or for heating the air which is for feeding the fire of the furnace in which the salt is melted or fused.

In the drawings, Figure 1 is a longitudinal sectional view of one form of apparatus for carrying out our invention, and Fig. 2 a detail view illustrating a slight modification.

A represents a long chamber constructed of brick and iron, and B a large vessel of infusible material, which receives the fused salt direct from the furnace in which it is melted or from an intermediate vessel, in which the molten salt is allowed to stand long enough to settle the impurities. This vessel is provided with a vertically-movable valve or gate $l$ of infusible material, which is designed to cover and uncover the upper end of the discharge-spout $s$, which extends into the interior of the chamber A. The stem $l'$ of this valve is advisably made of iron or steel and coated on its outside with an infusible material. Instead of this construction, however, two small iron tubes parallel and close together and connected at their lower ends by a full-turn elbow may be used. Such a double tubular stem can be kept from being affected by the molten salt by circulating a stream of water down through one tube and up through the other. At a point below the discharge-spout $s$ the vessel B is provided with an outlet $m$, which is kept normally closed, but which may be opened from time to time for the purpose of drawing off the impurities which settle to the bottom of the vessel.

Opening through the top wall of the chamber A is a pipe $p$, which is preferably jacketed with any suitable non-conducting material, and immediately below the mouth of the pipe is a screen or air-filter $n$, which, owing to the great heat in the chamber A, will advisably be made of asbestus or other non-combustible material. The space below the screen is divided into a series of compartments or bins C C' C$^2$ C$^3$ C$^4$ by a series of vertical partitions, said bins or compartments having conical or inclined bottoms which are provided with valved discharge-pipes $c$, as shown in Fig. 1.

D indicates a pump or blowing engine of any suitable or desired construction, which is mounted in a compartment or room separated from the interior of the chamber A. Connected with this pump or blowing engine is a coil or manifold $d$, which extends back and forth throughout the bins or compartments C C', &c. At its upper end the pipe or manifold is provided with a valve $b$, by which the flow of the air may be regulated or controlled.

Connected with the coil or manifold $d$, at a point beyond the valve $b$, is a reducing-pipe $q$, which enters the bottom of a small hopper E, arranged directly beneath the discharge-spout $s$. This hopper is provided with a suitable discharge-pipe $h$, arranged in line with the discharge end of pipe $q$, thereby forming an atomizer which, acting upon the fluid salt passing from the hopper E, forces said salt out through discharge-spout $h$ and causes the salt to assume a globular form. Although the air from the pipe $d$ is hot before it enters the atomizer, it is sufficiently cool to solidify the drops of fused salt blown from the atomizer. The hot air from the atomizer, being still further heated by contact with the fused liquid salt in the atomizer and the hot particles of salt blown into the chamber A, passes upward through the very large asbestus screen or filter $n$ into the pipe $p$, and thence to the fire-chamber of the salt-melting furnace or into contact with the raw salt for the purpose of giving to it a preliminary heating before it comes to the fusing-point. Where some other gas or mixture of gases than common air is used for filling the chamber A, then in place of the atomizer E $h$ $q$ we employ a wheel $k$, which, as shown in Fig. 2, is placed under the spout $s$. This wheel has a broad flat periphery set with numerous paddles or blades projecting from its outer face and is made to revolve rapidly by any suitable means. Under this arrangement the air-filter $n$ is removed, and the air-heating pipes $d$ $d$ $d$ are continued along and around inside of the chamber A to its top, and there back and forth overhead, and finally into the pipe $p$, this latter pipe under these conditions having no direct connection with the wide gas-space in chamber A. The atomized salt falls into the row of bins C C', &c., where it is cooled by the air passing through the coil or manifold $d$ and by the current of air which passes around the outside of the cone-shaped bottoms of the bins in the spaces $g$ $g$ $g$. The outside air enters this space through a hole O in the outside wall of the chamber A, and after passing under the bins passes through the strainer or filter $f$ into the blowing-engine D, from which it is forced through the pipe $d$ in the manner above stated.

The blower D will be fitted with two sets of valves, as is usual, so as to produce a continuous current of hot air. The walls of the chamber A are made very thick and heavy so as to retain the heat, and where desired may be covered with an air and gas tight iron case, as represented in the drawings.

While we have shown the chamber A as provided with a series of bins or compartments, we desire it to be understood that we do not limit ourselves to such an arrangement, as it is obvious that the said divisions may be dispensed with. The arrangement shown is, however, preferred, for the reason that it enables us to withdraw at any time salt of different degrees of fineness, as it is apparent that the action of the atomizer will serve to automatically adjust the salt according to its specific gravity into the respective bins or compartments.

Having thus described our invention, what we claim is—

1. In an apparatus for the manufacture of salt, the combination, with a chamber A, of a vessel B, adapted to contain fused or melted salt, an atomizer located within the chamber A, adapted to receive melted salt from the vessel B, a blowing-engine, and a coil or manifold connected therewith and with the atomizer.

2. In an apparatus for the manufacture of salt, the combination, with a chamber A, provided with a series of salt-receptacles, of a vessel B, adapted to contain fused or melted salt, an atomizer located within the chamber A, adapted to receive melted salt from vessel B, a blowing-engine, a coil or manifold connected therewith and with the atomizer, a series of passages around the bases of the salt-receptacles, an air-inlet O, communicating with the passages $g$, and a filter or screen $f$, separating the passages $g$ from the air-inlet pipe of the blowing-engine.

3. In an apparatus for the manufacture of salt, the combination, with a vessel or chamber A, provided with a series of salt-receptacles, of a receptacle B, adapted to contain the fused salt and to discharge the same into the interior of the chamber A, means for transforming the fused salt into globular form, and an asbestus air-filter located in the upper portion of the chamber A, as and for the purpose set forth.

4. In an apparatus for the manufacture of salt, the combination, with a chamber A, provided with a series of receptacles C C', &c., of a molten-salt vessel B, and an atomizer adapted to receive the molten salt from vessel B and to discharge the same into the respective compartments, substantially as shown and described.

In witness whereof we hereunto set our hands in the presence of two witnesses.

CHARLES F. LAWTON.
ALBERT L. LAWTON.
ARTHUR W. LAWTON.

Witnesses:
E. F. TURK,
D. C. BARNUM.